US009136587B2

(12) United States Patent
Chirila et al.

(10) Patent No.: US 9,136,587 B2
(45) Date of Patent: Sep. 15, 2015

(54) ANTENNA CONFIGURATION FOR CORNER PLACEMENT IN PORTABLE DEVICES

(75) Inventors: Laurian Petru Chirila, Richmond Hill (CA); Adrain Stagg, Belfountain (CA)

(73) Assignee: PSION INC., Mississaug, Ontario (CA)

( * ) Notice: Subject to any disclaimer, the term of this patent is extended or adjusted under 35 U.S.C. 154(b) by 507 days.

(21) Appl. No.: 13/109,479

(22) Filed: May 17, 2011

(65) Prior Publication Data

US 2012/0293375 A1 Nov. 22, 2012

(51) Int. Cl.
*G06K 19/00* (2006.01)
*H01Q 1/24* (2006.01)

(52) U.S. Cl.
CPC .................................... *H01Q 1/243* (2013.01)

(58) Field of Classification Search
USPC .......................................................... 343/702
See application file for complete search history.

(56) References Cited

U.S. PATENT DOCUMENTS

2004/0004789 A1 * 1/2004 Watanabe et al. ............. 360/132
2006/0279468 A1 * 12/2006 Yoneya et al. ................ 343/713

* cited by examiner

*Primary Examiner* — Matthew Mikels

(57) ABSTRACT

A portable device providing wireless communication capability with a network using an antenna subsystem. The portable device comprises a housing for supporting components of the portable device including the antenna subsystem, such that the housing includes a first housing corner having a first housing wall, a second housing wall in an opposed spaced apart relationship with the first housing wall, a third housing wall connecting the first housing wall with the second housing wall and a fourth housing wall connecting the first, second and third housing walls to one another. The portable device also has a first antenna of the antenna subsystem having a first non-planar metal layer positioned adjacent to at least three of the first, second, third and fourth housing walls of the first housing corner, such that the first non-planar metal layer extends away from the first housing corner in at least one of a parallel or non-parallel relationship with each of said at least three of the first, second, third and fourth housing walls.

29 Claims, 13 Drawing Sheets

ANTENNA CONFIGURATION FOR CORNER PLACEMENT IN PORTABLE DEVICES

FIELD

The present invention relates to antenna positioning in portable devices.

BACKGROUND

The increasing proliferation of portable devices in today's society is supported by the availability of various wireless networks and technologies that permit wireless communication to and from portable devices. On-board antennas are employed by portable devices to connect with the wireless networks and to connect directly with one another in the case of Bluetooth™ communication. Users of portable devices have come to rely upon the availability and the reliability of their wireless communication capabilities.

The design of the antennas, and their integration with portable devices, is becoming more complex. One driver of this design and integration complexity is the decreasing size of portable devices and associated decreasing physical size of the antennas. Space inside of the housing of portable devices is at a premium due to their ever increasing functionality and number of on-board components. Another driver for design and integration complexity is that modern portable devices typically employ two or more antennas, such that their placement in portable devices must account for proper operation of each antenna while minimizing electronic interference between the antennas and other nearby on-board electronic components. Further drivers of design and integration complexity is the ever increasing frequencies and bandwidths that the antennas must be compatible with. Accordingly, maximizing the signal strength and/or directionality of the radiation patterns of the antennas is important, as the quality of the signal strength and/or the directionality can affect the reliability of wireless communication.

SUMMARY

It is an object of the present invention to provide an antenna configuration in a portable device to obviate or mitigate at lease one of the above presented disadvantages.

Modern portable devices typically employ two or more antennas, such that their placement in portable devices must account for proper operation of each antenna while minimizing electronic interference between the antennas and other nearby on-board electronic components. Further, the antennas must be compatible with ever increasing frequencies and bandwidths. Contrary to current antenna designs for portable devices is a portable device providing wireless communication capability with a network using at antenna subsystem. The portable device comprises a housing for supporting components of the portable device including the antenna subsystem, such that the housing includes a first housing corner having a first housing wall, a second lousing wall in an opposed spaced apart relationship with the first housing wall, a third housing wall connecting the first housing wall with the second housing wall and a fourth housing wall connecting the first, second and third housing walls to one another. The portable device also has a first antenna of the antenna subsystem having a first non-planar metal layer positioned adjacent to at least three of the first, second, third and fourth housing walls of the first housing corner, such that the first non-planar metal layer extends away from the first housing corner in at least one of a parallel or non-parallel relationship with each of said at least three of the first, second, third and fourth housing walls.

A first aspect provided is aportable device providing wireless communication capability with a network using an antenna subsystem, the portable device comprising: a housing for supporting components of the portable device including the antenna subsystem, the housing including a first housing corner having a first housing wall, a second housing wall in an opposed spaced apart relationship with the first housing wall, a third housing wall connecting the first housing wall with the second housing wall and a fourth housing wall connecting the first, second and third housing walls to one another and a first antenna of the antenna subsystem having a first non-planar metal layer positioned adjacent to at least three of the first, second, third and fourth housing walls of the first housing corner, the first non-planar metal layer extending away from the first housing corner in at least one of a parallel or non-parallel relationship with each of said at least three of the first, second, third, and fourth housing walls.

A second aspect provided is a substrate configured for mounting an antenna in a housing interior of a portable device, the antenna providing wireless communication capability with a network, the substrate comprising: a substrate corner having a first substrate wall, a second substrate wall in an opposed spaced apart relationship with the first substrate wall, a third substrate wall connecting the first substrate wall with the second substrate wall and a fourth substrate housing wall connecting the first, second and third substrate walls to one another and the antenna having a non-planar metal layer mounted on at least three of the first, second, third and fourth substrate walls of the substrate corner, the non-planar metal layer extending away from the substrate corner on each of said at least three of the first, second, third and fourth substrate walls.

BRIEF DESCRIPTION OF THE DRAWINGS

Embodiments of the present invention will now be described by way of example only with reference to the following drawings in which.

DESCRIPTION OF THE EMBODIMENTS

It is noted that as used herein, the term "portable device" is intended to encompass a wide range of digital devices including, without limitation, devices which transmit and/or receive digital information, such as mobile computers, mobile phones, handheld computers, digital cameras, hand held scanners and other electronic devices configured to transmit receive, read, and process wireless signals via one or more antennas. It is further recognized that the portable device can be embodied in a number of form factors, including smart phones, handheld personal digital assistants (PDAs), Ultra-Mobile PCs, Tablet PCs, and laptops that include one or more antennas configured for communicating over wireless networks.

It is noted that as used herein, the term "antenna" is intended to encompass a wide range antenna applications including, without limitation, non-directional based antennas such as WAN, WIFI and/or Bluetooth communication technologies. One form of the antenna can be a printed antenna, such that a metal layer of the printed antenna is configured (e.g. tuned for specific frequencies by selecting surface area and shape of the metal layer) for receiving, transmitting, or transceiving electromagnetic signals.

Figure 1:
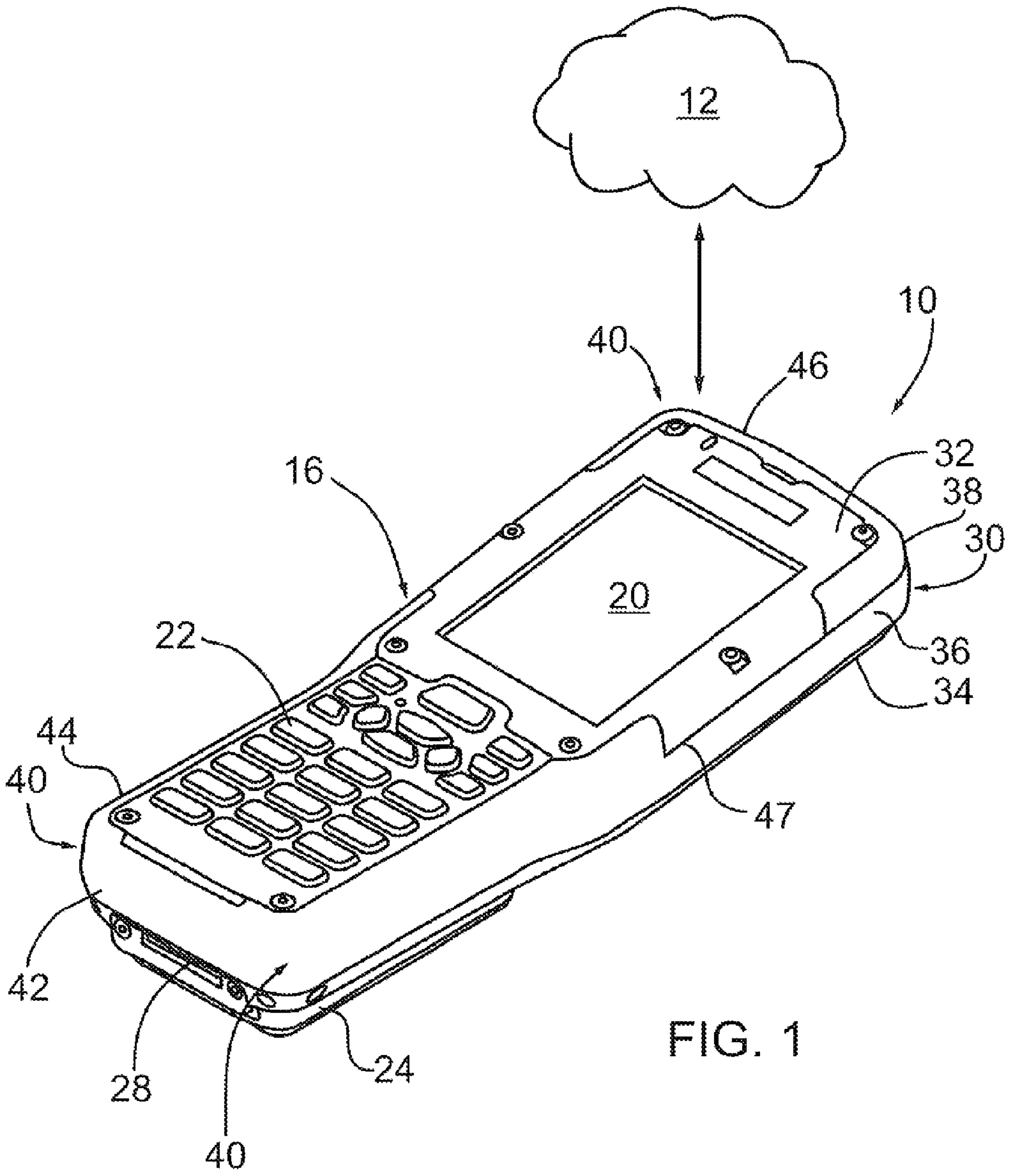
FIG. 1 shows a perspective view of an example housing of a portable device.
Figure 2:
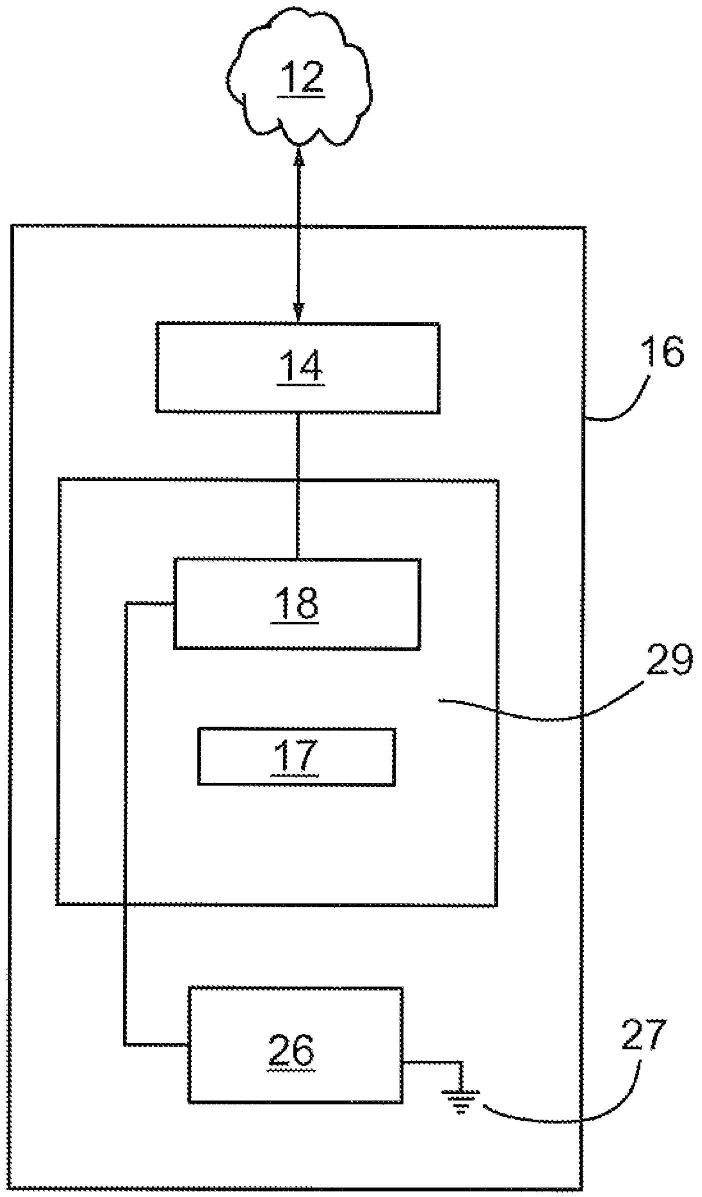
FIG. 2 shows a conceptual block diagram of components, and subsystems of the portable device of FIG. 1.

Referring to FIGS. 1 and 2, shown is a portable device 10 configured to provide wireless communications (e.g. with a network 12 or directly with another portable device or other wireless device such as an RFID tag or Bluetooth enabled device) using an antenna subsystem 14, having one or more individual antennas coupled to one or more radio module(s) 18. The radio module 18 functions as a receiver, transmitter, or transceiver for the coupled antennas. The portable device 10 has a housing 16 constructed of suitable material (e.g. plastic and/or metal) for supporting or otherwise facilitating the mounting of electronic components 17 (e.g. computer processor, memory, etc.), including the antenna subsystem 14. Other device components can include, without limitation, a display 20 (e.g. a touch screen), a keypad 22, a battery compartment 4 containing a battery 26 and an expansion port 28 such as a Universal Serial Bus (USB) port or other similar expansion port for coupling compatible peripheral devices (not shown) to the portable device 10. The battery 26 can be used as a power source transmission operation of the antennas. The portable device 10 can also have a printed circuit board (PCB) 29 for mounting of any of the electronic components 17, the antenna subsystem 14, and the radio modules 18, for example.

Positioning of the antenna(s) in or on the portable device 10 is defined with respect to one or more corners of the housing 16. The housing 16 includes a first housing corner 30 having a first housing wall 32, a second housing wall 34 in an opposed spaced apart relationship with the first housing wall 32, a third housing wall 36 connecting the first housing wall 32 with the second housing wall 34 and a fourth housing wall 38 connecting the first 32, second 34 and third 36 housing walls to one another. The housing 16 also has a number of second housing corners 40 that can share two or more of the first 32, second 34 third 36 and fourth 38 housing walls with the first housing corner 30, along with a fifth housing wall 42 that connects the first 32, second 34 and third 36 housing walls and/or a sixth housing wall 44 that connects the first 32, second 34 and fourth 38 (or fifth 42) housing walls to one another. As an example configuration of the housing 16 of the portable device 10, the first housing wall 32 can be a front face, the second housing wall 34 can be a back face, the third housing wall 36 can be a side wall and the sixth housing wall 44 can be the other side wall, the fourth housing wall 38 can be a distal end (e.g. furthest end from a user of the portable device 10) and the fifth housing wall 42 can be a proximal end (e.g. closest end to the user of the portable device 10).

It is recognized that a wall edge 46 of two adjacent, housing walls can define an interior angle formed by the two intersecting adjacent housing walls (e.g. first 32 and fourth as housing walls). Alternatively, it is recognized that the wall edge 46, as formed by at least two adjacent housing walls, can form an arcuate shape, (e.g. semi-spherical) such as shown by example with the first 32, second 32 and fifth 42 housing walls. It is also recognized that the shape of each of housing walls can be planar or non-planar, as desired, including where the housing wall can contains an additional corner edge 47 positioned between two of the adjacent housing walls (e.g. on the third housing wall 36). It is also recognised that adjacent ones of the housing walls can be orthogonal to one another, as desired. It is also recognised that adjacent ones of the housing walls can be non-orthogonal to one another, or at least have wall portions that are non-orthogonal to one another, as desired.

Figure 3:
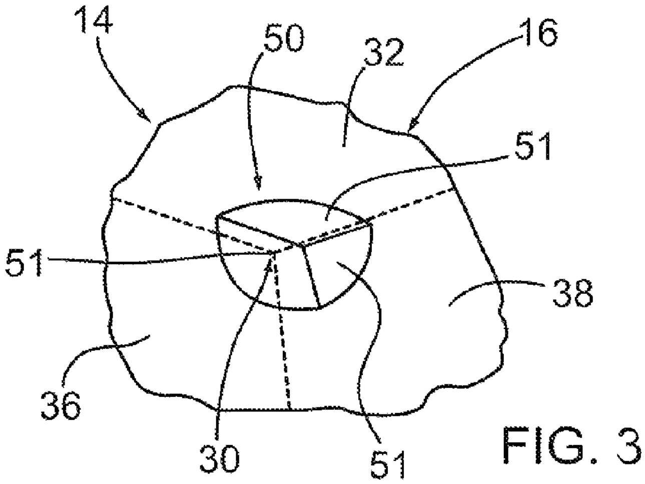
FIG. 3 is a conceptual diagram of a perspective view of a first corner with antenna for the housing of FIG. 1.
Figure 4:
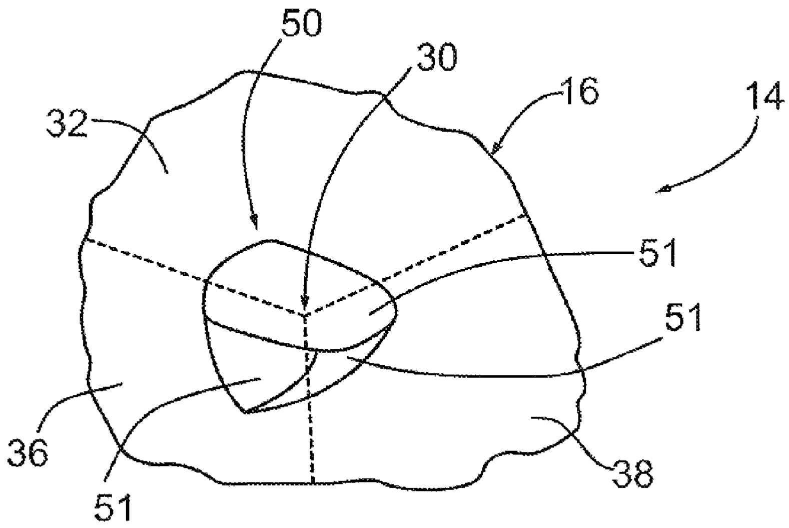
FIG. 4 is an alternative embodiment of the first corner with antenna for the housing of FIG. 3.
Figure 5:
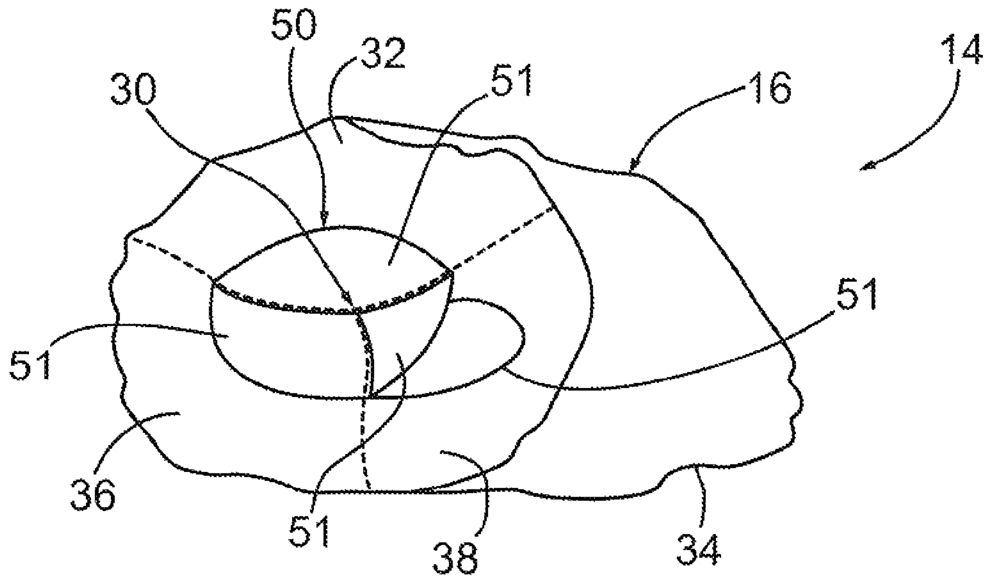
FIG. 5 is a further embodiment of the first corner with antenna for the housing of FIG. 3.

Referring to FIGS. 2, 3 and 4, the antenna subsystem 14 includes a first antenna 50 having a first non-planar metal layer 52 positioned adjacent to at least three (e.g. the first 32, third 36 and fourth 38 shown in ghosted view for illustration purposes only) housing walls of the first housing corner 30, such that the first non-planar metal layer 52 extends away from the first housing corner 30 in at least one of a parallel (FIG. 3 showing all parallel) and/or non-parallel (FIG. 4 showing a combination of parallel and non-parallel) relationship(s) with respect to each of the housing walls. FIG. 5 shows the first non-planar metal layer 52 positioned adjacent to all four of the first 32, second 34, third 36 and fourth 38 housing walls of the first housing corner 30, such that the first non-planar metal layer 52 extends (e.g. in a parallel relationship) away from the first housing corner 30 with each of the four housing walls. As noted, the use of the non-planar configuration of the metal layer provides an advantage of positioning an increased amount of radiating surface 51 of the antenna in the corner region of the portable device 10. This is compared to a planar metal layer (not shown) of similar surface area to that of the radiating surface 51, which would be forced to, project inwards into the interior of the housing 16 and thereby position more of the radiating surface away from the corner region.

In one embodiment, mounting of the first antenna 50 can be done directly on the housing 16 itself, using the housing 16 as a substrate for the first non-planar metal layer 52 and/or as a support for the substrate of the first non-planar metal layer 52. For example, the first antenna 50 can be mounted on an interior surface (i.e. internal to the housing 16) of the first housing corner 30 or on the exterior surface (i.e. external to the housing 16) of the first housing corner 30, as desired.

Figure 6:
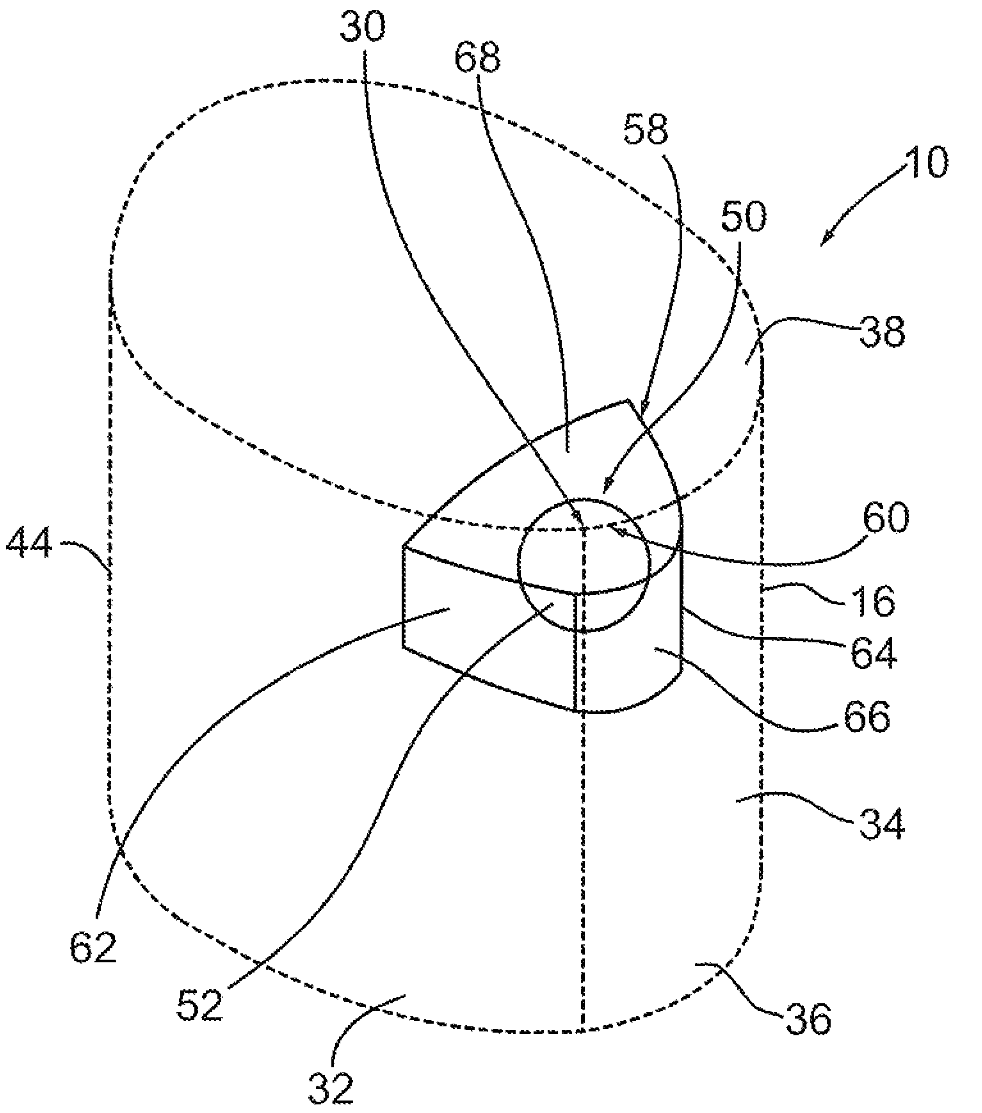
FIG. 6 is a conceptual diagram showing in perspective view a substrate for mounting the antenna in the first corner of the housing of FIG. 1.

In an alternative embodiment shown in FIG. 6, the portable device 10 can include a first substrate 58 having the first antenna 50 (shown in ghosted view) mounted (e.g. positioned by an adhesive layer not shown) thereon and the first substrate 58 is mounted in the interior of the housing 16 (shown in ghosted view), so as to position the first antenna 50 in the region of the first housing corner 30. The first substrate 58 has a first substrate corner 60 having a first substrate wall 62, a second substrate wall 64 in an opposed spaced apart relationship with the first substrate wall 62, a third substrate wall 66 between the first substrate wall 62 and the second substrate wall 64 and a fourth substrate wall 68 between the first 62, second 64 and third 66 substrate walls, such that the first non-planar metal layer 52 of the first antenna 50 is mounted on at least three of the first 62, second 64, third 66 and fourth 68 substrate walls corresponding to the at least three of the first 32, second 34, third 36 and fourth 38 housing walls (see FIG. 1). As shown in FIG. 6, the first non-planar metal layer 52 extends away from the first substrate corner 60 along each of the at least three substrate walls. In alternative (not shown), the first non-planar metal layer 52 can be mounted on all four of the first 62, second 64, third 66 and fourth 68 substrate walls (not shown) of the first substrate corner 60, such that the first non-planar metal layer 52 extends away from the first substrate corner 60 along each of the four substrate walls.

It is recognized that two adjacent substrate walls can define an interior angle formed by the two intersecting adjacent substrate walls (e.g. first 62 and fourth 68 substrate walls). Althernatively, it is recognized that at least two adjacent substrate walls can form an arcuate shape (e.g. semi-spherical) such as shown by example with the first 62, second 64 and third 66 substrate walls. It is also recognized that the shape of each of substrate walls can be planar or non-planar, as desired, including where the substrate wall can contains an additional corner edge positioned between two of the adjacent substrate walls. It is recognised that adjacent ones of the substrate walls can be orthogonal to one another, as desired. It is also recognised that adjacent ones of the substrate walls can be non-orthogonal to one another, as desired.

Figure 7:
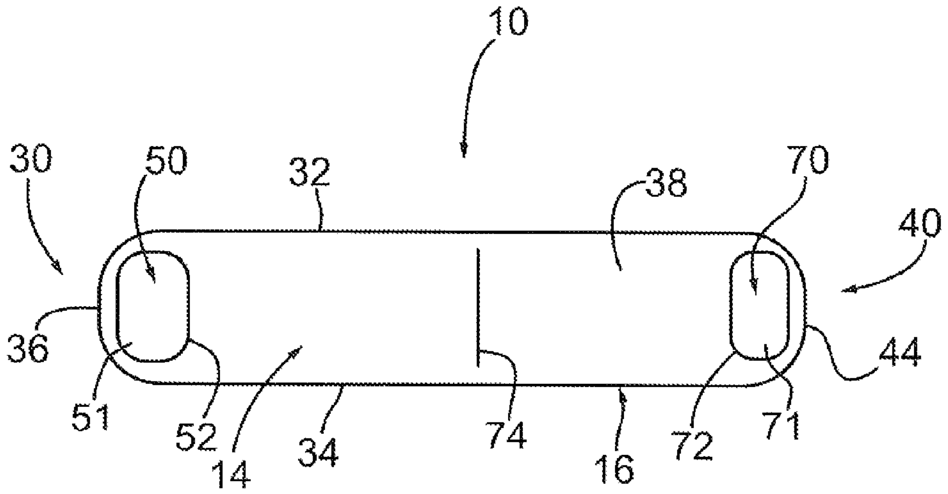
FIG. 7 is a conceptual diagram showing in top view a multiple antenna configuration in the housing of the portable device of FIG. 1.

Referring to FIG. 7, shown is a multiple antenna configuration of the antenna subsystem 14 of the portable device 10, such that two antennas are shown for demonstration purposes only, namely the first antenna 50 having radiating surfaces 51 and the second antenna 70 having radiating surfaces 71. It is recognised that the second antenna 70 can be positioned in any of the second housing corners 40, as desired. The positioning of multiple antennas in the antenna subsystem 14 of the portable device is advantageous for beam farming applications, which can leverage arrays of transmit and receive antennas to help control the directionality and shape of the radiation patterns of the antennas. As shown in FIG. 7, the first 50 and second 70 antennas have spatial, separation by being positioned on opposing first 30 and second 40 housing corners, as further described below.

The first antenna 50 is positioned in the first corner 30 and the second antenna 70 is positioned in the selected second corner 40 (as defined by the first 32, second 34, fourth 38 and sixth 44 housing walls by example only), such that the second housing corner 40 of the housing 16 is in a spaced apart relationship opposite the first housing corner 30. The second antenna 70 of the antenna subsystem 14 has a second non-planar metal layer 72, positioned adjacent to at least three of the first 32, second 34, fourth 38 and sixth 44 housing walls of the second housing corner 40, such that the second non-planar metal layer 72 extends away from the second housing corner 40 in at least one of a parallel or non-parallel relationship with each of said at least three of the first 32, second 34, fourth 38 and sixth 44 housing walls. Also part of the antenna subsystem 14 is an electromagnetic interference (EMI) shield 74 positioned between the first, and second antennas for facilitating electromagnetic isolation between a first radiation pattern of the first antenna 50 and a second radiation pattern of the second antenna 70. The EMI shield 74 is preferably composed of an electromagnetic radiation attenuating material (e.g. ferrous metal) and can be connected to a ground 27 (see FIG. 2) of the portable device 10.

In alternative (not shown), the second non-planar metal layer 72 can have four radiating surface 71 that can be positioned adjacent to the first 32, second 34, fourth 38 and sixth 44 housing walls of the second housing corner 40, such that the second non-planar metal layer 72 extends away from the second substrate corner 80 along each of the four housing walls.

Similar to that discussed above, in an embodiment, mounting of the second antenna 70 can be done directly on the housing 16 itself, using the housing 16 as a substrate for the second non-planar metal layer 72 and/or as a support for the substrate of the second non-planar metal layer 72. For example, the second antenna 70 can be mounted on the interior surface (i.e. internal to the housing 16) of the second housing corner 40 or on the exterior surface (i.e. external to the housing 16) of the second housing corner 40, as desired.

Figure 8:
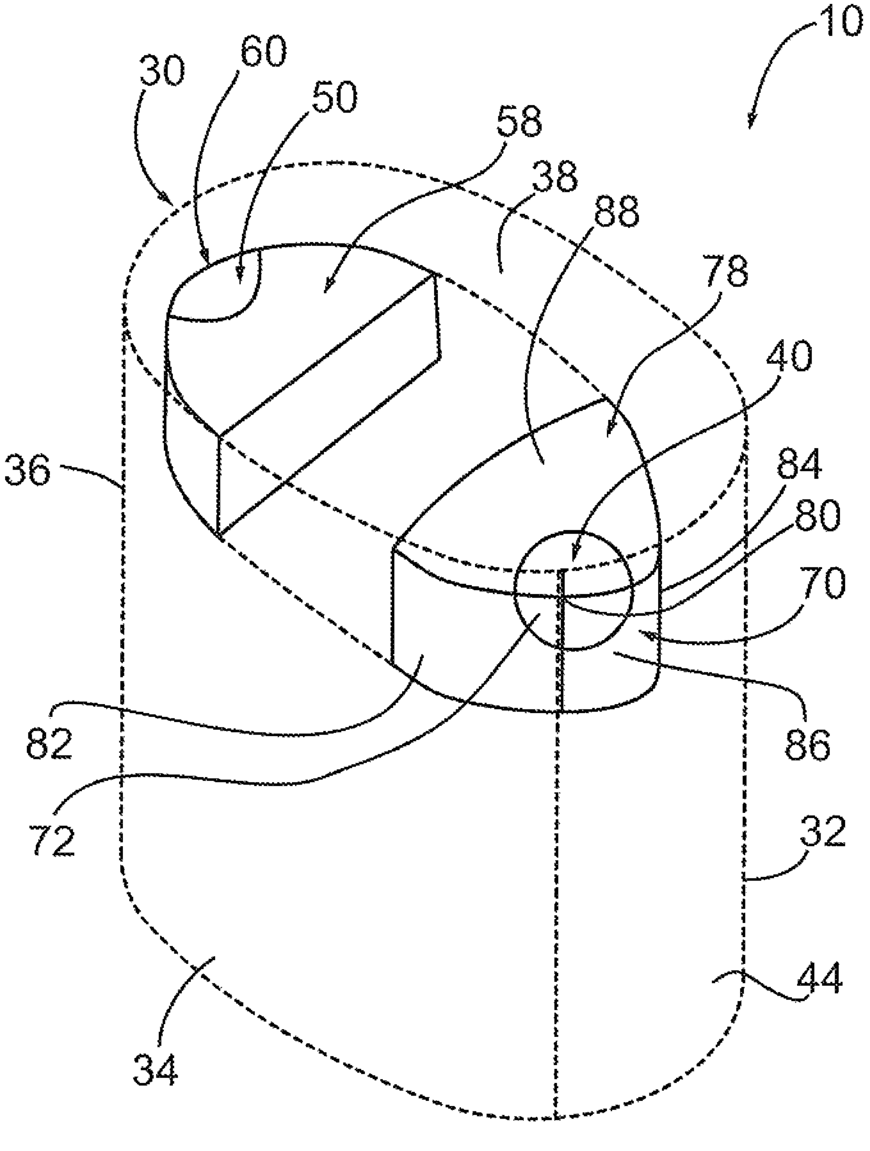
FIG. 8 is a further embodiment for the multiple antenna configuration showing in perspective view substrates for mounting antennas in two corners of the housing of FIG. 1.

In an alternative embodiment of the multiple antenna configuration shown in FIG. 8, the portable device 10 can include a second substrate 78 having the second antenna 70 mounted (e.g. positioned by an adhesive layer not shown) thereon and the second substrate 68 is mounted in the interior of the housing 16 (shown in ghosted view), so as to position the second antenna 70 in the region of the second housing corner 40. The second substrate 78 has a second substrate corner 80 having a fifth substrate wall 82, a sixth substrate wall 84 in an opposed spaced apart relationship with the fifth substrate wall 82, a seventh substrate wall 86 between the fifth substrate wall 82 and the sixth substrate wall 84 and a eighth substrate wall 88 between the fifth 82, sixth 84 and seventh 86 substrate walls, such that the second non-planar metal layer 72 of the second antenna 70 is mounted on at least three of the fifth 82, sixth 84, seventh 86 and eighth 88 substrate walls corresponding to the at least three of the first 32, second 34, fourth 38 and sixth 44 housing walls (see FIG. 1). As shown in FIG. 8, the second non-planar metal layer 72 extends away from the second substrate corner 80 along each of the at least three substrate walls. In alternative (not shown), the second non-planar metal layer 72 can be mounted on all four of the fifth 82, sixth 84, seventh 86 and eighth 88 substrate walls of the second substrate corner 80, such that the second non-planar metal layer 72 extends away from the second substrate corner 80 along each of the four substrate walls.

As shown in FIG. 8 in ghosted view, it is recognized that the first substrate 58 and the second substrate 78 can be formed as an integral support the first 50 and second 70 antennas, such that the first 62 and fifth 82 substrate walls are the same wall and the second 64 and sixth 84 substrate walls are the same wall.

Figure 9:
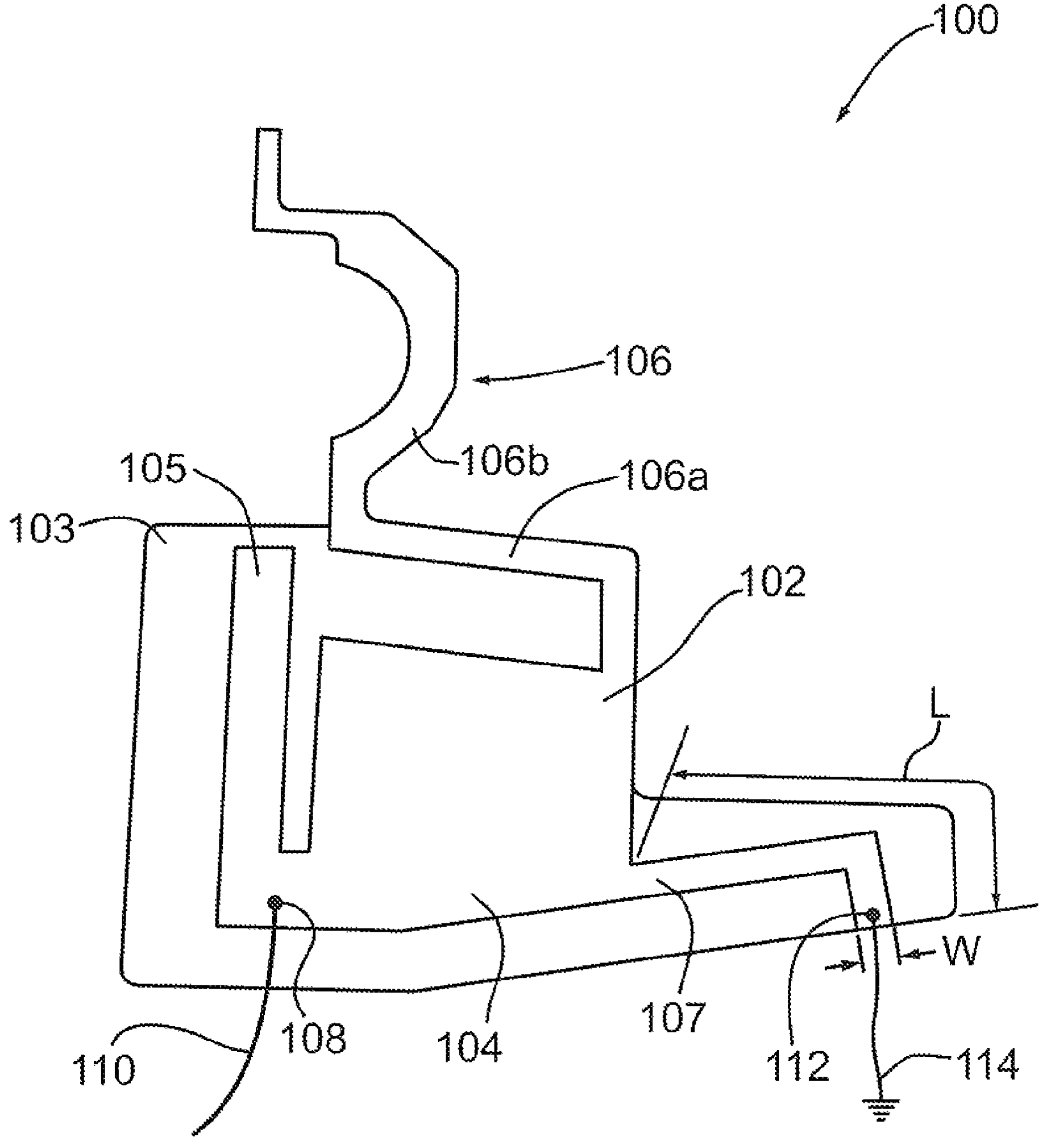
FIG. 9 shows an embodiment of the antenna of the portable device of FIG. 1.

Referring to FIG. 9, shown is an embodiment of the antenna (e.g. first antenna 50, second antenna 70), referred to generically by reference numeral 100, and the metal layer (e.g. first non-planar metal layer 52, second non-planar metal layer 72), referred to generically by reference numeral 102. It is noted that the non-planar metal layer 102 is shown before being mounted (e.g. on the housing 16 and/or on the first 58 or second 78 substrate), therefore in a planar configuration in FIG. 9 for explanation purposes only. The non-planar metal layer 102 is positioned, by example, on an flexible adhesive backing 103, which provides for adhesion of the non-metal planar layer 102 onto suitable surfaces of the housing 16 or the first substrate 58 or second substrate 78.

The antenna 100 has a first radiation portion 104 and can have one or more second radiation portions 105, 106, 107 extending from the first radiation portion 104. As an example; the first radiation portion 104 can be configured for resonating at multiple resonant frequencies, for example a first resonant frequency and a second resonant frequency, such that the second resonant frequency is higher that the first resonant frequency. Each of the second radiation portions 105, 106, 107 can be configured to resonate at the first resonant frequency, the second resonant frequency, or both the first and the second resonant frequencies in cooperation with the first radiation portion 104. As an example, the second radiation portion 105 is configured to resonate at the second resonant frequency only, the second radiation portion 106 is configured to resonate at the first resonant frequency only, and the second radiation portion 107 is configured to resonate at both the first resonant frequency and the second resonant frequency. In this manner, it is recognised that at least two of the second radiation portions 105, 106, 107 can be configured to resonate at different resonant frequencies.

The second radiation portions 105, 106, 107 can also be referred, to as legs or extensions, as their shape has a length L greater than a width W. The second radiation portions 105, 106, 107 are electrically connected to the first radiation portion 104. The first radiation portion 104 and optionally one or more of the second radiation portions 105, 106, 107 are configured for receiving; transmitting, or transceiving electromagnetic signals with respect to the antenna 100. One of the second radiation portions 106 has a first extension 106*a* (e.g. L shaped) electrically connected to the first radiation portion 104 and a second extension 106*b* (e.g. arcuate shaped) electrically connected to the first extension 106*a*.

The non-planar metal layer 102 has feed point 108 for coupling to a feed line 110 (for connecting to the radio module(s) 18) and a ground point for connecting (not shown) to the ground 27 of the portable device 10 (see FIG. 2). The feed point 108 is where the feed line 110 is electrically connected to the non-planar metal layer 102 and can be used for feeding electric signals to the non-planar metal layer 102. In the present embodiment, the ground point 112 can be positioned on one of the second radiation portions 106 extending from the first radiation portion 104.

Figure 10:
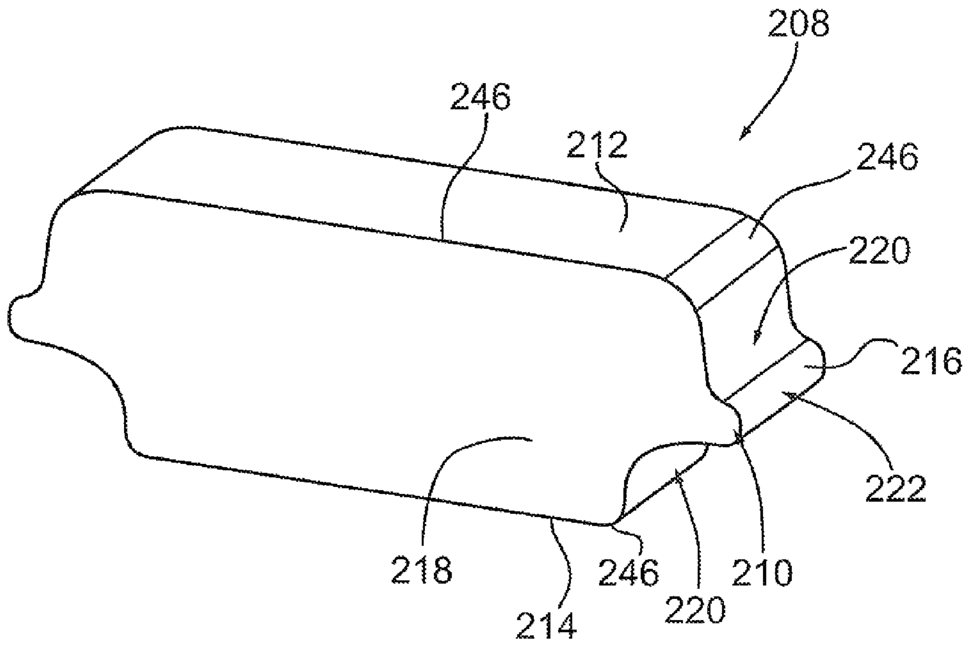
FIG. 10 shows a top perspective view of an example support structure for the antenna the portable device of FIG. 1.

Referring to FIG. 10, shown is an embodiment of a support structure (e.g. housing 16, first substrate 58, second substrate 78, etc) for the antenna 100, referred to generically by reference numeral 208. The support structure 208 has a first corner 210 having a first wall 212, a second wall 214 opposed in a spaced apart relationship with the first wall 212, a third wall 216 between the first wall 212 and the second wall 214 and a fourth wall 218 between the first wall 212, the second wall 214, and the third wall 216. It is noted that the third wall 216 can a number of concave portions 220 and a convex portion 222, for example. Also noted is that corner edges 246 between the walls of the structure 208 can have a radius, as desired.

Figure 11:
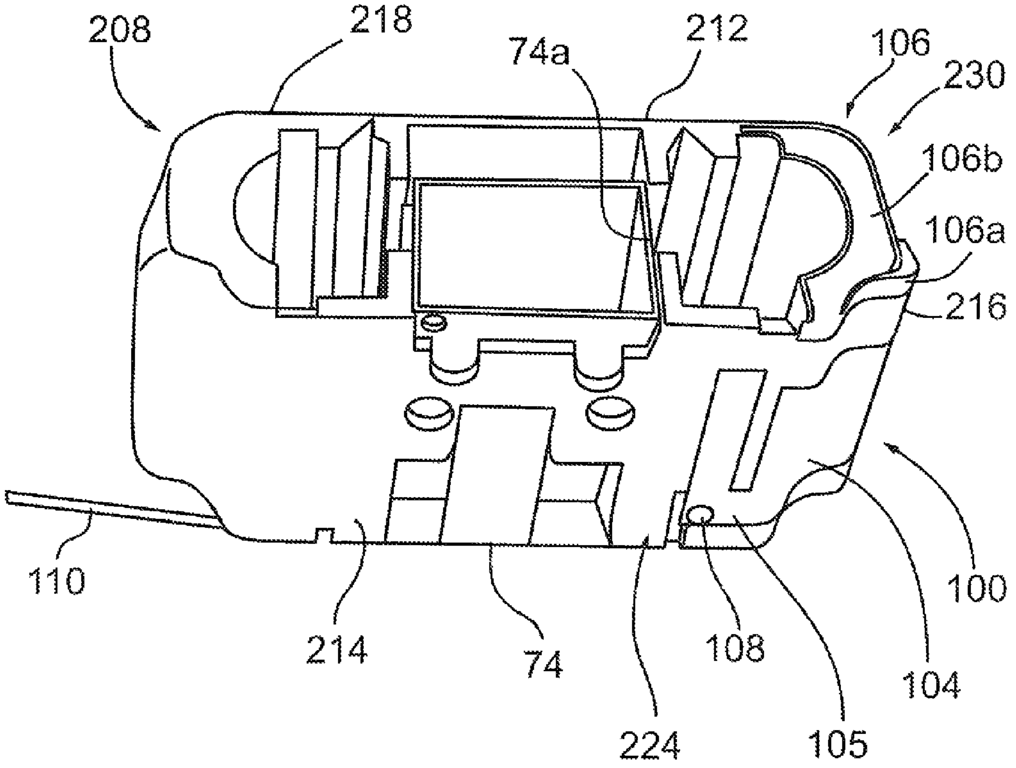
FIG. 11 shows a perspective front view of an embodiment of the support structure of FIG. 10.
Figure 12:
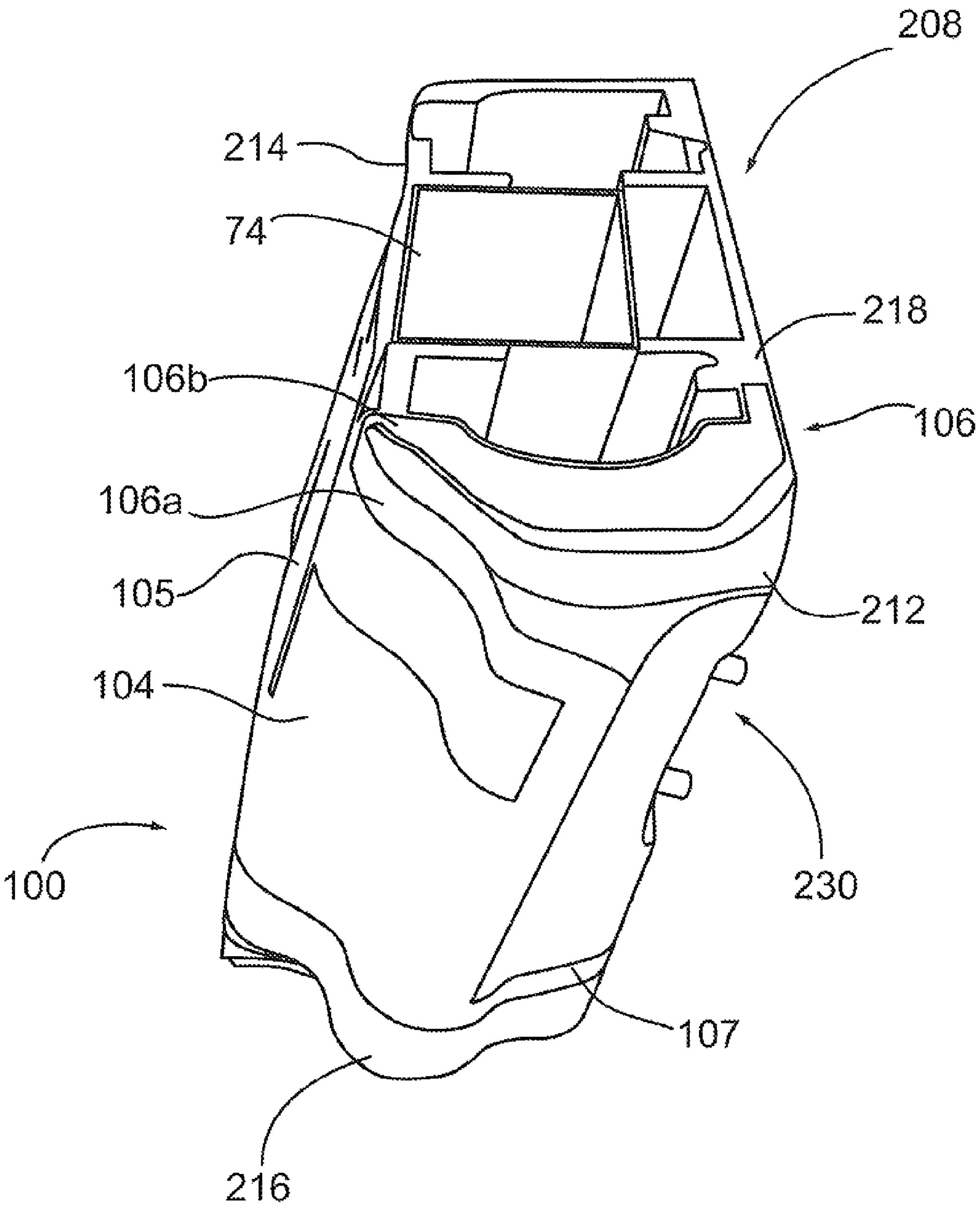
FIG. 12 shows a perspective side view of the support structure of FIG. 10.
Figure 13:
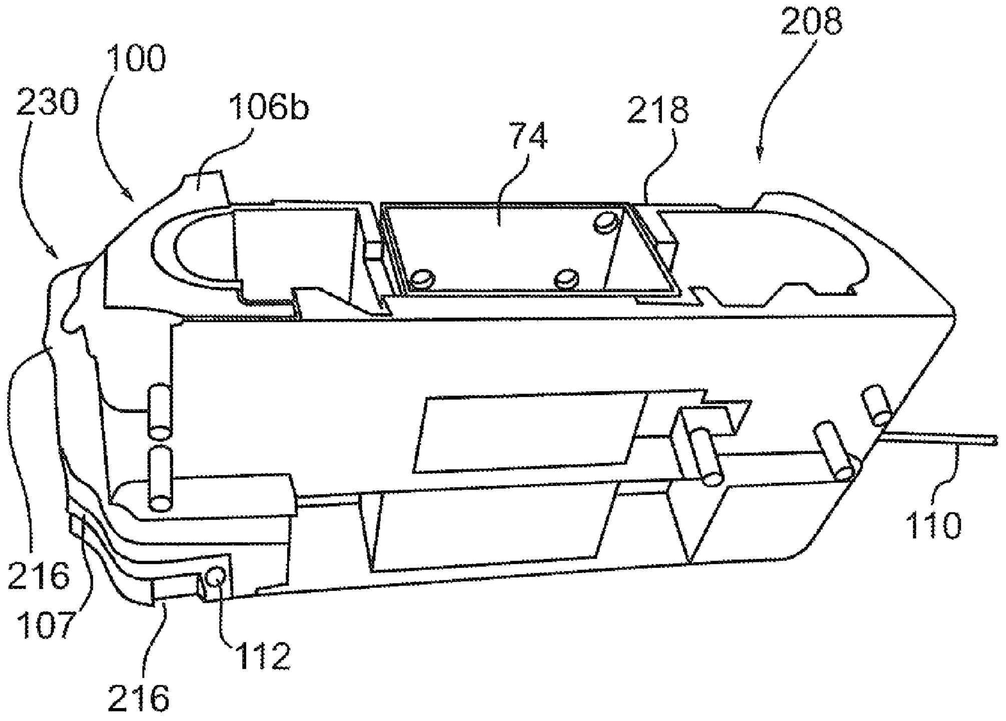
FIG. 13 shows a perspective rear view of the support structure of FIG. 10.

Referring to FIGS. 11, 12 and 13, shown are various perspective views of the antenna 100 mounted to an exterior surface 224 of the support structure 208. FIG. 11 shows the antenna 100 mounted on the corner 230 with the first radiation portion 104 mounted on the wall 214 and the adjacent wall 216, one of the second radiation portions 105 mounted on the wall 214, and another of the second radiation portions 107 mounted on the wall 216 and the wall 218, such that the first extension 106*a* is on the wall 216 and the second extension 106*b* is on the different and adjacent wall 218. In this example embodiment, the wall 216 and the wall 218 can be orthogonal to one another. In FIG. 12, shown is another of the second radiation portions 107 positioned on the wall 212. In this embodiment, the feed point 108 (see FIG. 11) is positioned on the wall 214 and the ground point 112 (see FIG. 13) is positioned on the second wall 214 that is in the opposed, spaced apart relationship with the first wall 212. One advantage of this configuration is that the feed point 108 and the ground point 112 are electrically distanced from one another.

Referring again to FIG. 11, the EMI shield 74 can have a first shield wall 74*a* that extends between the first wall 212 and the wall 214, such that the first shield wall 74*a* is in an opposed and spaced apart, relationship with the third wall 216. One advantage of positioning the first shield wall 74*a* in the opposed and spaced apart relationship with the third wall 216 is to position as much of the metal layer of the first radiation portion 104 (on the third wall 216) as possible away from the grounded. EMI shield 74. Also, the arcuate shaped second extension 106*b* can be curved in a convex orientation away from the first shield wall 74*a*. One advantage of positioning the convex orientation of the second extension 106*b* with respect to the first shield wall 74*a* is to position as much of the metal layer of the second extension 106*b* as possible away from the grounded EMI shield 74.

Figure 14:
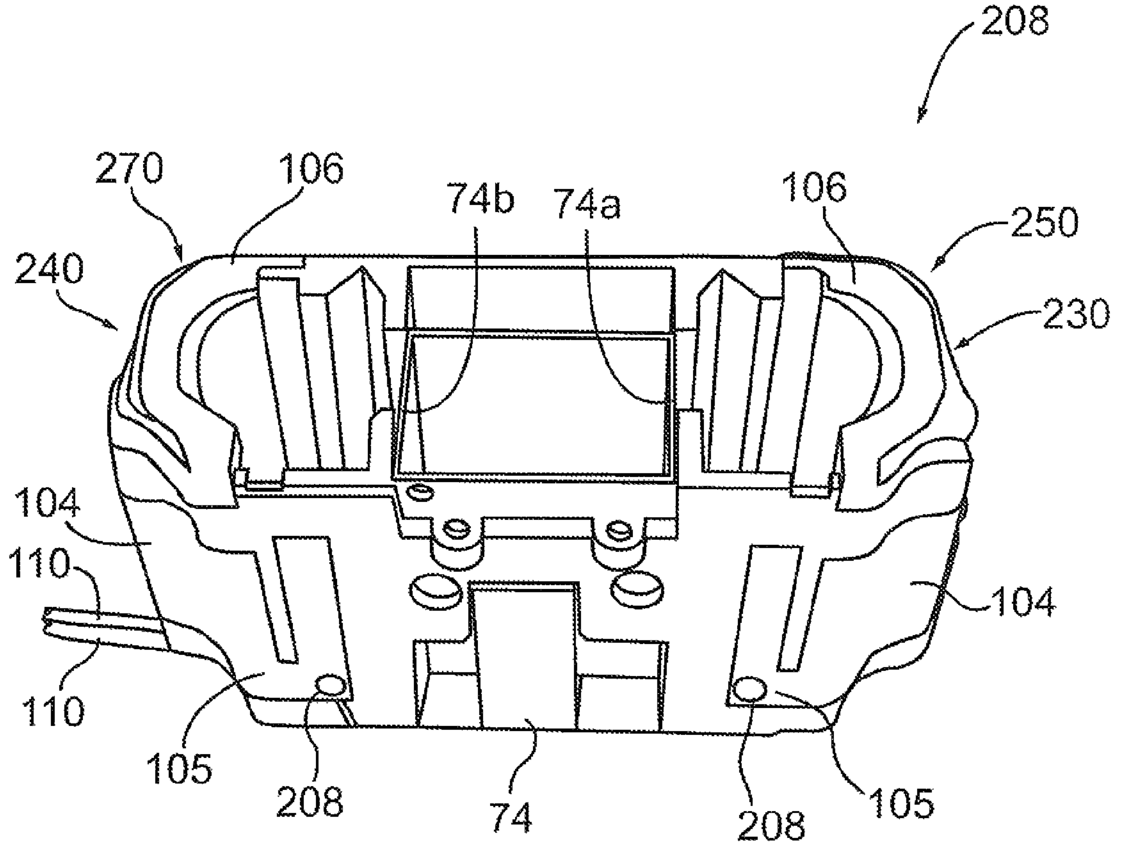
FIG. 14 shows a perspective front view of a further embodiment of the support structure of FIG. 10 with two antennas.

Referring to FIG. 14, shown is an alternative embodiment of the support structure 208 having a first antenna 250 on the corner 230 and a second antenna 270 mounted on an opposing corner 240, representing a pair of co-located antennas. The EMI shield 74 has the first shield wall 74*a* in an opposed spaced apart relationship with the first antenna 250 and a second shield wall 74*b* in an opposed spaced apart relationship with the second antenna 270. Each of the first 250 and second 270 antennas can have their own feed point 208, so as to facilitate operation of the first 250 antenna as a main antenna and the second antenna 270 as a diversity antenna. In general, spatial diversity employs multiple antennas, usually with the same characteristics (e.g. geometry such as dimension, shape, surface area and positioning of their metal layers) but in a reverse orientation with respect to one another. In spatial diversity, the multiple antennas are physically separated front one another, such that the diversity is exhibited by different radiation patterns (i.e. different directions in space) during simultaneous operation of the multiple antennas. Interference between the different radiation patterns can be inhibited by the reverse orientation of the multiple antennas with respect to one another, as well as by the positioning of an EMI shield between the multiple, antennas.

In terms of FIG. 14, the reverse and spaced apart orientation of the first 250 and second 270 antennas provides for space diversity there-between, such that signals of the first 250 and second 270 antennas are transmitted over-two different propagation paths, including separate feed lines 110 to each of the separate feed points 208. As an example, the reversed orientation (e.g. mirrored) of the first radiation portions 104 and the second radiation portions 105, 106, 107 of the first 250 and second 270 antennas facilitates simultaneous operation of the first 250 and second 270 antennas.

The invention claimed is:

1. A portable device providing wireless communication capability with a network using an antenna subsystem, the portable device comprising:

a housing for supporting components of the portable device including the antenna subsystem, the housing including a first housing corner having a first housing wall, a second housing wall in an opposed spaced apart relationship with the first housing wall, a third housing wall connecting the first housing wall with the second housing wall and a fourth housing wall connecting the first, second and third housing walls to one another, said housing including a second housing corner in a spaced apart relationship from the first housing corner, the second housing corner having the first, second and third housing walls and having a fifth housing wall connecting the first, second and third housing walls to one another;

a first antenna of the antenna subsystem having a first non-planar metal layer positioned adjacent to at least three of the first, second, third and fourth housing walls of the first housing corner, the first non-planar metal layer extending away from the first housing corner in at least one of a parallel or non-parallel relationship with each of said at least three of the first, second, third and fourth housing walls;

a second antenna of the antenna subsystem having a second non-planar metal layer positioned adjacent to at least three of the first, second, third and fifth housing walls of the second housing corner, the second non-planar metal layer extending away from the second housing corner in at least one of a parallel or non-parallel relationship with each of said at least three of the first, second, third, and fifth housing walls; and an electromagnetic interference (EMI) shield for facilitating electromagnetic isolation between a first radiation pattern of the first antenna and a second radiation pattern of the second antenna.

2. The portable device of claim 1, wherein mounting of the first antenna is selected from the group consisting of: on the interior surface of the first housing corner; and on the exterior surface of the first housing corner.

3. The portable device of claim 2 further comprising the first non-planar metal layer positioned adjacent to all four of the first, second, third and fourth housing walls of the first housing corner, the first non-planar metal layer extending away from the first housing corner in at least one of a parallel or non-parallel relationship with each of said all four of the first, second, third and fourth housing walls.

4. The portable device of claim 1 further comprising a wall corner edge defining an interior angle formed by two intersecting walls of the first, second, third and fourth housing walls.

5. The portable device of claim 1 further comprising at least two of the walls of the first, second, third and fourth housing walls connecting to form an arcuate shape.

6. The portable device of claim 1, wherein the shape of each of the first, second, third and fourth housing walls is selected from the group consisting of planar and non-planar.

7. The portable device of claim 1, wherein at least one housing wall of the first, second, third and fourth housing walls contains a corner edge positioned between two of the adjacent housing walls connected to the at least one housing wall.

8. The portable device of claim 1, wherein the first, second, third and fourth housing walls are selected from the group consisting of a side wall of the housing; a proximal end of the housing; a distal end of the housing; a top face of the housing; and a bottom face of the housing.

9. The portable device of claim 1 further comprising a first substrate having the first antenna mounted thereon and the first substrate mounted in an interior of the housing.

10. The portable device of claim 9, wherein the first substrate has a first substrate corner having a first substrate wall, a second substrate wall in an opposed spaced apart relationship with the first substrate wall, a third substrate wall between the first substrate wall and the second substrate wall and a fourth substrate wall between the first, second and third substrate walls, such that the first non-planar metal layer of the first antenna is mounted on at least three of the first, second, third and fourth substrate walls corresponding to said at least three of the first, second, third and fourth housing walls; wherein the first non-planar metal layer extends away from the first substrate corner along each of said at least three of the first, second, third and fourth substrate walls.

11. The portable device of claim 10 further comprising the first non-planar metal layer mounted on all four of the first, second, third and fourth substrate walls of the first substrate corner, the first non-planar metal layer extending away from the first substrate corner along each of said all four of the first, second, third and fourth substrate walls.

12. The portable device of claim 10 further comprising a substrate corner edge defining an interior angle formed by two intersecting walls of the first, second, third and fourth substrate walls.

13. The portable device of claim 10 further comprising at least two of the walls of the first, second, third and fourth substrate walls connecting to form an arcuate shape.

14. The portable device of claim 10, wherein the shape of each of the first, second, third and fourth substrate walls is selected from the group consisting of: planar and non-planar.

15. The portable device of claim 1, wherein at least one substrate wall of the first, second, third and fourth substrate walls contains a corner edge positioned between two of the adjacent substrate walls connected to the at least one substrate wall.

16. The portable device of claim 1 further comprising a second housing corner of the housing in a spaced apart relationship opposite the first housing corner, the second housing corner having the first, second and third housing walls and having a fifth housing wall connecting the first, second and third housing walls to one another;

a second antenna of the antenna subsystem having a second non-planar metal layer positioned adjacent to at least three of the first, second, third and fifth housing walls of the second housing corner, the second non-planar metal layer extending away from the second housing corner in at least one of a parallel or non-parallel relationship with each of said at least three of the first, second, third, and fifth housing walls; and the electromagnetic interference (EMI) shield positioned between the first and second antennas for facilitating electromagnetic isolation between the first radiation pattern of the first antenna and a second radiation pattern of the second antenna.

17. The portable device of claim 1, wherein mounting of the second antenna is selected from the group consisting of: on the interior surface of the second housing corner; and on the exterior surface of the second housing corner.

18. The portable device of claim 1, wherein the third housing wall is selected from the group consisting of a side wall of the housing; a proximal end of the housing and a distal end of the housing.

19. The portable device of claim 9 further comprising a second housing corner of the housing in a spaced apart relationship opposite the first housing corner, the second housing corner having the first, second and third housing walls and having a fifth housing wall connecting the first, second and third housing walls to one another;

a second antenna of the antenna having a second non-planar metal layer positioned adjacent to at least three of the first, second, third and fifth housing walls of the second housing corner, the second non-planar metal layer extending away from the second housing corner in at least one of a parallel or non-parallel relationship with each of said at least three of the first, second, third, and fifth housing walls; and the electromagnetic interference (EMI) shield positioned between the first and second antennas for facilitating electromagnetic isolation between the first radiation pattern of the first antenna and a second radiation pattern of the second antenna.

20. The portable device of claim 1, further comprising a second substrate having the second antenna mounted thereon and the second substrate mounted in the interior of the housing.

21. The portable device of claim 20, wherein the second substrate has a second substrate corner having a fifth substrate wall, a sixth substrate wall in an opposed spaced apart relationship with the fifth substrate wall, a seventh substrate wall between the fifth substrate wall and the sixth substrate wall and a eighth substrate wall between the fifth, sixth and seventh substrate walls, such that the second non-planar metal layer of the second antenna is mounted on at least three of the fifth, sixth, seventh and eighth substrate walls corresponding to said at least three of the first, second, third and fifth housing walls; wherein the second non-planar metal layer extends away from the second substrate corner along each of said at least three of the fifth, sixth, seventh and eighth substrate walls.

22. The portable device of claim 1, wherein the first substrate and the second substrate are formed as an integral support for the first and second antennas, such that the first and fifth substrate walls are the same wall and the second and sixth substrate walls are the same wall.

23. A portable device providing wireless communication capability with a network using an antenna subsystem, the portable device comprising:

a housing for supporting components of the portable device including the antenna subsystem, the housing including a first housing corner having a first housing wall, a second housing wall in an opposed spaced apart relationship with the first housing wall, a third housing wall connecting the first housing wall with the second housing wall and a fourth housing wall connecting the first, second and third housing walls to one another, said housing including a second housing corner in a spaced apart relationship from the first housing corner, the second housing corner having the first and second housing walls, a fifth housing wall connecting the first housing wall with the second housing wall and a sixth housing wall connecting the first, second, and fifth housing walls to one another;

a first antenna of the antenna subsystem having a first non-planar metal layer positioned adjacent to at least three of the first, second, third and fourth housing walls of the first housing corner, the first non-planar metal layer extending away from the first housing corner in at least one of a parallel or non-parallel relationship with each of said at least three of the first, second, third and fourth housing walls;

a second antenna of the antenna subsystem having a second non-planar metal layer positioned adjacent to at least three of the first, second, fifth and sixth housing walls of the second housing corner, the second non-planar metal layer extending away from the second housing corner in at least one of a parallel or non-parallel relationship with each of said at least three of the first, second, fifth, and sixth housing walls; and an electromagnetic interference (EMI) shield positioned between the first and second antennas for facilitating electromagnetic isolation between a first radiation pattern of the first antenna and a second radiation pattern of the second antenna.

24. The portable device of claim 23, wherein mounting of the second antenna is selected from the group consisting of: on the interior surface of the second housing corner; and on the exterior surface of the second housing corner.

25. The portable device of claim 23, wherein the fourth housing wall is a proximal end of the housing and the fifth housing wall is a distal end of the housing.

26. The portable device of claim 23 further comprising a first substrate having the first antenna mounted thereon and the first substrate mounted in an interior of the housing.

27. The portable device of claim 26 further comprising a second substrate having the second antenna mounted thereon and, the second substrate mounted in the interior of the housing.

28. The portable device of claim 27, wherein the second substrate has a second substrate corner having a fifth substrate wall, a sixth substrate wall in an opposed spaced apart relationship with the fifth substrate wall, a seventh substrate wall between the fifth substrate wall and the sixth substrate wall and a eighth substrate wall between the fifth, sixth and seventh substrate walls, such that the second non-planar metal layer of the second antenna is mounted on at least three of the fifth, sixth, seventh and eighth substrate walls corresponding to said at least three of the first, second, fifth and sixth housing walls; wherein the second non-planar metal layer extends away from the second substrate corner along each of said at least three of the fifth, sixth, seventh and eighth substrate walls.

29. The portable device of claim 1 further comprising the first non-planar metal layer having a first radiation portion and a plurality of second radiation portions extending from the first radiation portion, wherein at least two of the plurality of second radiation portions are configured to resonate at different resonant frequencies.

* * * * *